US005797286A

United States Patent [19]

Armstrong

[11] Patent Number: 5,797,286

[45] Date of Patent: Aug. 25, 1998

[54] LOCKSET

[75] Inventor: Steven Armstrong, Yorba Linda, Calif.

[73] Assignee: Emhart Inc., Newark, Del.

[21] Appl. No.: 819,175

[22] Filed: Apr. 29, 1997

[51] Int. Cl.[6] .......... B60R 25/02

[52] U.S. Cl. .......... 70/224; 70/190

[58] Field of Search .......... 70/190, 191, 218, 70/224, 284, 285, 379 A, 379 R, 380, 381, 422

[56] References Cited

U.S. PATENT DOCUMENTS

| | | | |
|---|---|---|---|
| 4,854,143 | 8/1989 | Corder et al. | 70/218 |
| 5,010,749 | 4/1991 | Lin | 70/190 |
| 5,150,592 | 9/1992 | Lin | 70/190 |
| 5,186,030 | 2/1993 | Lin | 70/190 |
| 5,199,285 | 4/1993 | Lin | 70/224 X |
| 5,317,889 | 6/1994 | Solovieff et al. | 70/224 |
| 5,544,507 | 8/1996 | Lin | 70/107 |

FOREIGN PATENT DOCUMENTS

| | | | |
|---|---|---|---|
| 281850 | 8/1990 | United Kingdom | 70/190 |

*Primary Examiner*—Suzanne Dino Barrett
*Attorney, Agent, or Firm*—Spencer T. Smith

[57] ABSTRACT

A lockset having a bezel surrounding the cylinder lock which can be rotated when the door is unlocked to relock the door.

2 Claims, 5 Drawing Sheets

LOCKSET

BACKGROUND OF THE INVENTION

The present invention relates to locksets and more particularly to locksets which include an exterior lock which is key operable but which can be relocked from the exterior by rotating a rotatable bezel.

Conventional deadbolts are key operated from the outside, whether opening or locking the door. When it is dark outside the door, finding the key hole can be difficult. To obviate this problem, deadbolts have been designed to permit exterior locking without a key. U.S. Pat. Nos. 5,150,592, 5,010,749, disclose locks which operate in this manner.

It is an object of the present invention to provide a simplified design which will permit relocking without a key.

Other objects and advantages of the present invention will become apparent from the following portion of this specification and from the accompanying drawings which illustrate in accordance with the mandate of the patent statutes a presently preferred embodiment incorporating the principles of the invention.

BRIEF DESCRIPTION OF THE DRAWING

Referring to the drawings.

DESCRIPTION OF THE PREFERRED EMBODIMENT

Figure 1:
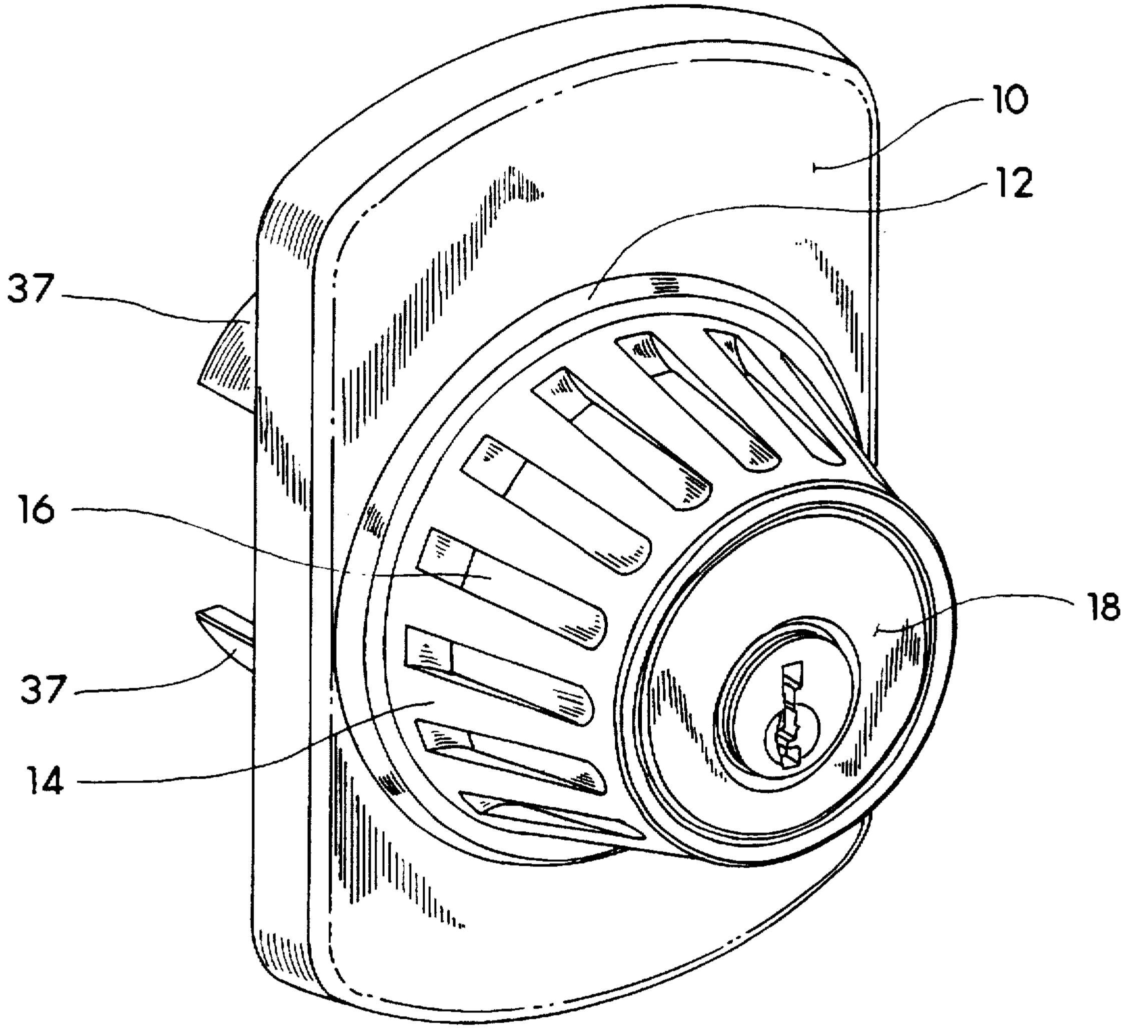
FIG. 1 is an oblique front view of a deadbolt made in accordance with the teachings of the present invention.
Figure 2:
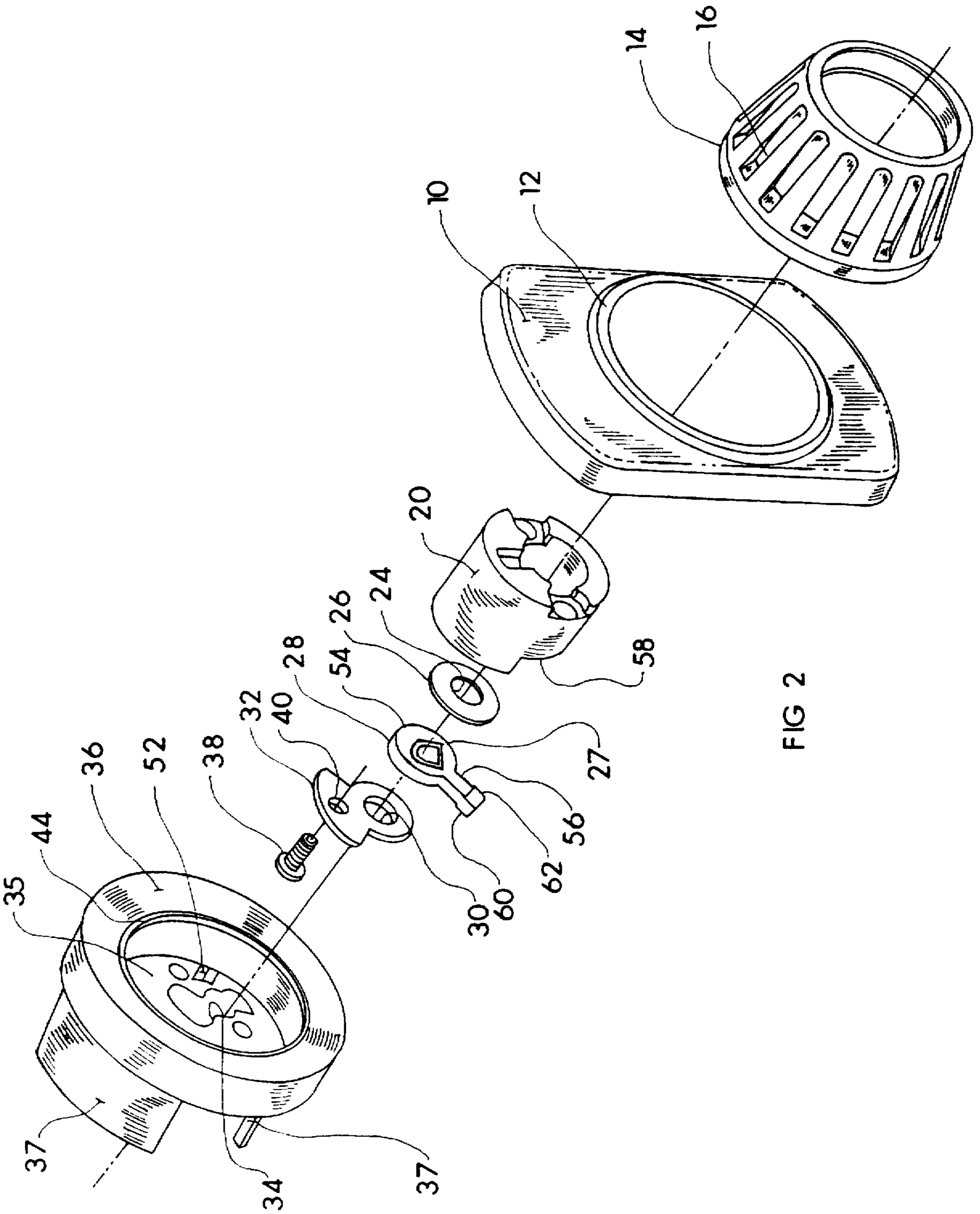
FIG. 2 is an oblique exploded view of a portion of the deadbolt illustrated in FIG. 1.
Figure 3:
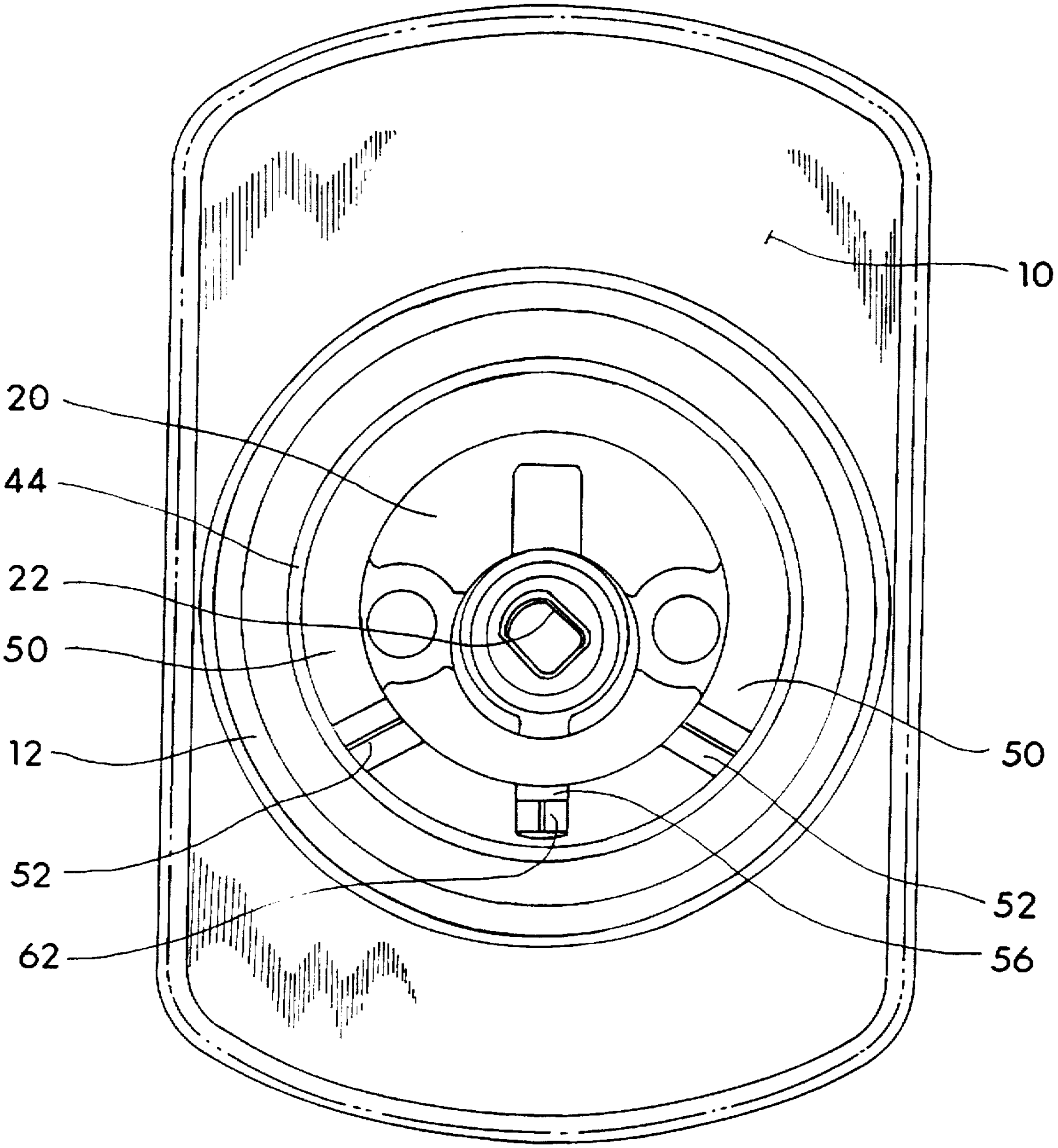
FIG. 3 is a front view of the deadbolt portion shown in FIG. 1 with the deadbolt cylinder and bezel portions removed.
Figure 4:
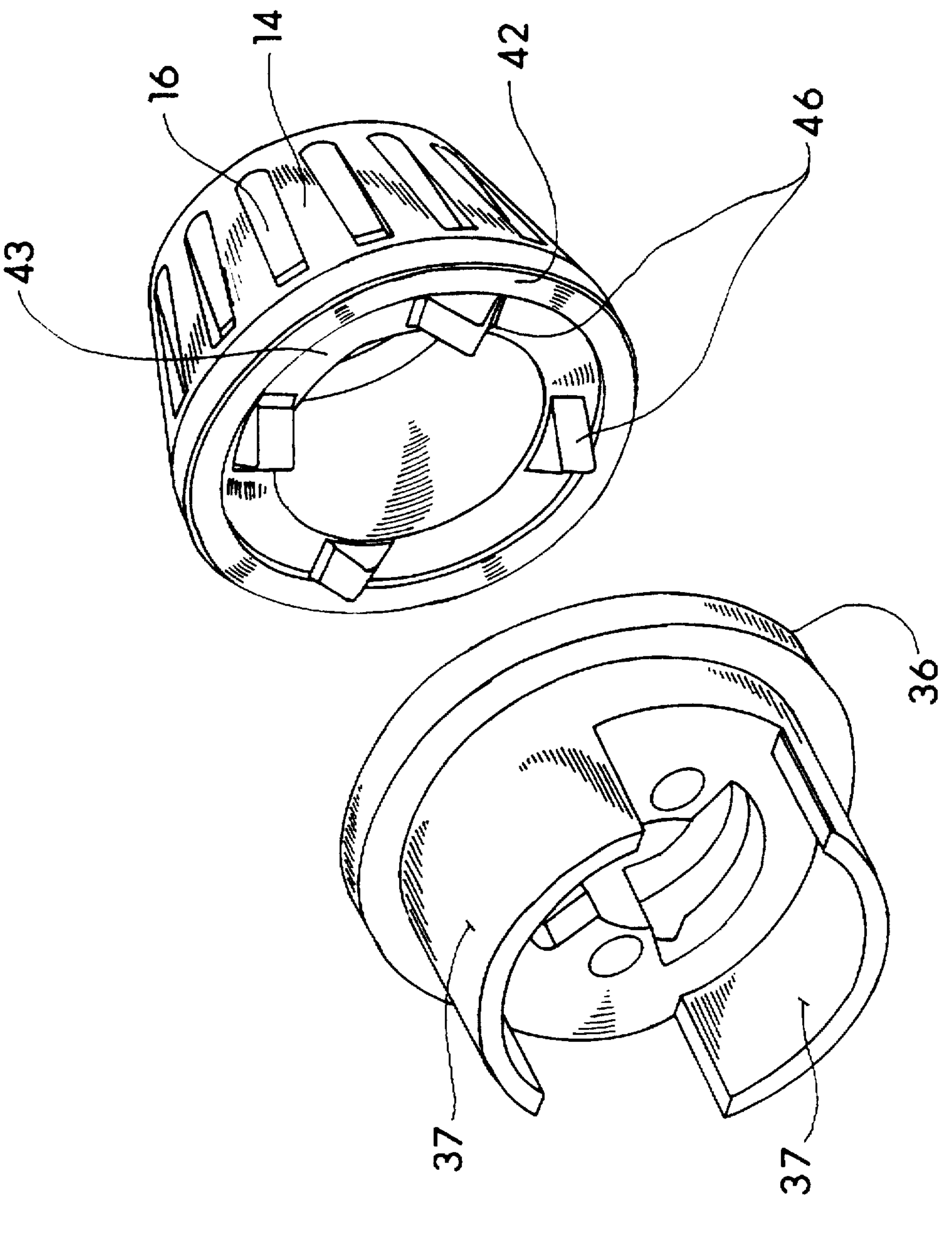
FIG. 4 is an oblique separated view showing a portion of the deadbolt shown in FIG. 2 from the other end.

The deadbolt includes a decorative shroud 10 which has an annular outwardly projecting lip 12, a conical rotatable bezel 14 which may have outwardly extending grips 16 and a cylinder portion 18 which holds the bezel on the shroud. The cylinder portion 18, which is received by a housing 20 (FIG. 2), receives a "D" shaped torque blade 22 (FIG. 3) which passes through a circular hole 24 in a compression spring 26, through a "D" shaped hole 27 in a cam element 28, through a circular hole 30 in a cover 32 and freely through a large opening 34 in a support plate 36. The support plate includes upper and lower shield portions 37. A screw 38 which passes through a suitable opening 40 in the cover and into a suitable hole (not shown) in the housing traps the cam element between the cover and the end of the cylinder with a limited degree of axial movement. For further details of a conventional deadbolt cylinder please see U.S. Pat. No. 5,317,889.

Figure 5:
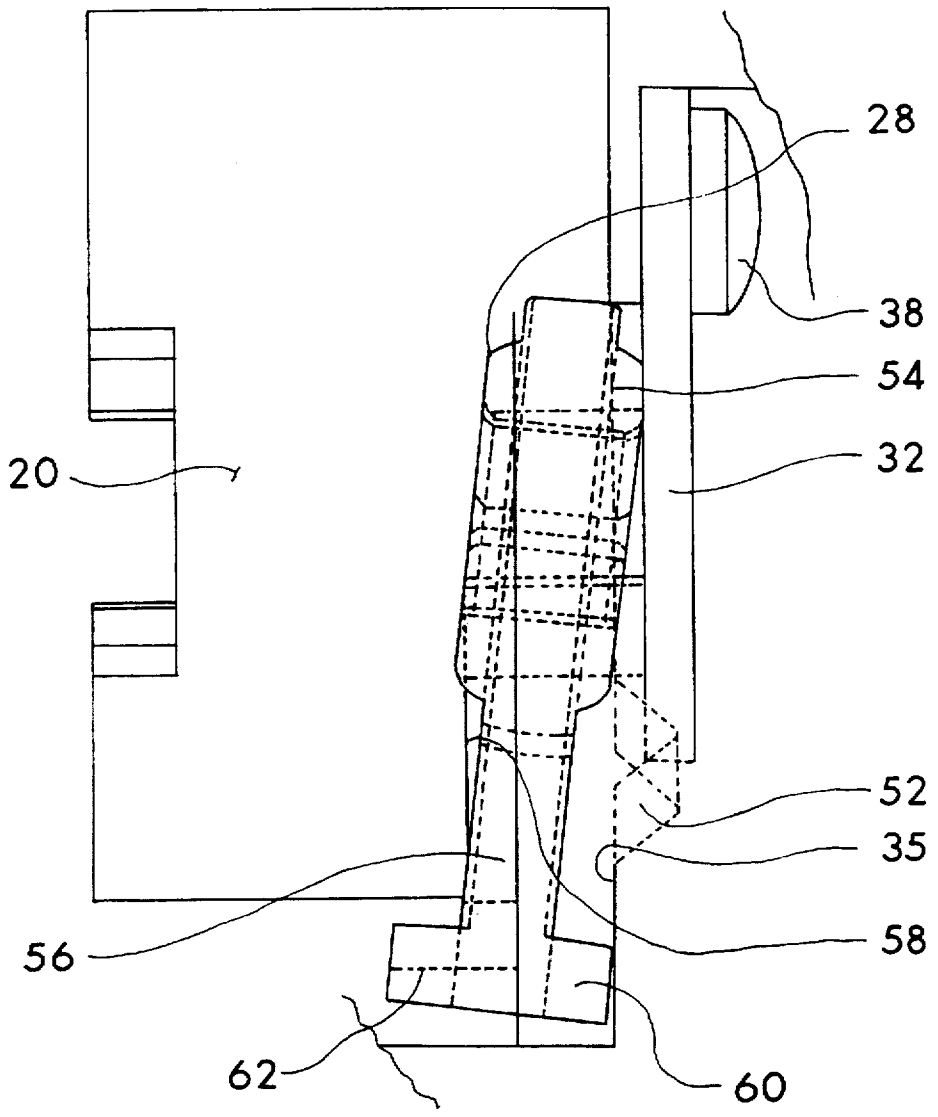
FIG. 5 is side elevational view of the cam element when the door is in the unlocked condition.

The end of the bezel adjacent the door has an outer annular surface 42 which is located between the annular lip 12 of the decorative shroud and a raised annular lip 44 on the support plate 36 and engages the support plate and an inner annular surface 43 which is slightly recessed. Located on this inner annular surface and within the support plate raised annular lip 44 are four 90° spaced bezel teeth 46 (at 0°, 90°, 180° and 270°) which extend toward the door. Defined on the annular portion 50 of the surface of the support plate within the annular lip 44 and axially adjacent the inner annular surface are located a pair of radial notches 52 (FIG. 3) which are located about 30° on either side of the 180° location. One of these notches is for left hand operation and the other is for right hand operation. The cam element 28, which rotates with the torque blade 22, has a head portion 54 which is received within the open end of the housing 20 and an arm portion 56 which extends outwardly through a slot 58 defined in the end of the housing. The arm terminates in a first tooth 60 which projects axially toward the annular portion 50 on the support plate and which is shaped to be received by either of the radial notches 52 and in a second tooth 62 which projects axially toward the inner annular portion 43 on the bezel and which is shaped to be engaged and rotatively displaced by any of the bezel teeth 46 when the bezel is rotated. When the deadbolt is locked either by operating the key in the front lock or by either doing the same thing on the interior lock or operating an interior turn lever, the cam element will be rotated with the torque blade whereby the first cam tooth will be retracted from the support plate notch that it is in when the door is locked and rides along the flat surface of the support plate until it becomes located at the 6:00 position illustrated in FIG. 3 (the cam is forcefully displaced axially along the torque rod). As shown in FIG. 5, such movement is carried out by the cam element pivoting slightly when the first tooth rides on the surface of the support bracket. In the event any of the four bezel teeth are in the path of the second cam tooth 62 as the cam rotates to this position the bezel will be rotated with the cam element. The door can be relocked in a traditional manner by operating either the key or the turn lever. Additionally the door can be relocked from the outside by rotating the bezel in the direction that will return the cam to its initial position (the bezel will only rotate in one direction). When the bezel is rotated, one of the bezel teeth will engage the second cam tooth and rotatively drive the cam back to its start position where the force of the compression spring 26 will force the first tooth of the cam into the notch on the support plate that defines the initial cam position (door locked). At this location the second cam tooth and the bezel teeth become axially separated so that rotation of the bezel has no function.

I claim:

1. A lockset comprising a keyed cylinder including an axially extending torque blade, a support plate mountable on a door, a cylindrical bezel, means for rotatably supporting said cylindrical bezel between said keyed cylinder and said support plate, said support plate including an annular surface facing said bezel having an axially extending notch therein located at a door locked location, said bezel including an annular surface facing said support plate annular surface, a plurality of axially projecting teeth on said bezel annular surface, and a cam element including a hole for receiving said torque blade so that said cam element can be slidably displaced along said torque blade and so that said cam element will rotate with said torque blade, a first tooth projecting axially towards said support plate annular surface for riding on said support plate annular surface when the door is unlocked and selectively configured for insertion into said axially extending notch when the door is locked and a second tooth projecting axially towards said bezel annular surface and selectively configured to engage one of said bezel teeth in the event that said bezel is rotated while said second tooth is riding on said annular surface, said second tooth and said bezel teeth being axially spaced when said first tooth is at the door locked position, a spring for biasing said cam element towards said support plate, said hole being selectively configured so that said cam element can selectively move so that said first tooth can either enter said notch or ride on the annular surface of said support plate, whereby said bezel can be rotated when the door is unlocked so that one of said bezel teeth will engage said cam second tooth which will be located on said support plate annular surface to thereby rotatively drive said cam element until said first tooth is forced into said notch by said spring.

2. A lockset according to claim 1, wherein said support bracket includes a second axially extending notch therein located at a second door locked location.

* * * * *